(12) United States Patent
Sugden

(10) Patent No.: US 12,524,927 B2
(45) Date of Patent: Jan. 13, 2026

(54) GENERATING PROMPTS FOR IMAGE GENERATION USING A GENERATIVE ARTIFICIAL INTELLIGENCE MODEL

(71) Applicant: AUDIOTROCITIES LLC, Jackson, WY (US)

(72) Inventor: Glenn E. Sugden, Windsor, CA (US)

(73) Assignee: AUDIOTROCITIES LLC, Jackson, WY (US)

( * ) Notice: Subject to any disclaimer, the term of this patent is extended or adjusted under 35 U.S.C. 154(b) by 151 days.

(21) Appl. No.: 18/468,313

(22) Filed: Sep. 15, 2023

(65) Prior Publication Data

US 2025/0095222 A1    Mar. 20, 2025

(51) Int. Cl.
*G06F 16/532* (2019.01)
*G06F 3/0482* (2013.01)
*G06T 11/00* (2006.01)

(52) U.S. Cl.
CPC ............ *G06T 11/00* (2013.01); *G06F 3/0482* (2013.01); *G06F 16/532* (2019.01)

(58) Field of Classification Search
None
See application file for complete search history.

(56) References Cited

U.S. PATENT DOCUMENTS

| | | | |
|---|---|---|---|
| 9,256,861 B2 | 2/2016 | Blattner | |
| 2021/0042662 A1 | 2/2021 | Pu et al. | |
| 2023/0177878 A1* | 6/2023 | Sekar | G06F 40/40 382/103 |
| 2024/0296606 A1* | 9/2024 | Smetanin | G06N 3/047 |
| 2024/0320867 A1* | 9/2024 | Bean | G06T 11/00 |

FOREIGN PATENT DOCUMENTS

| | | |
|---|---|---|
| CN | 102946491 | 2/2013 |
| WO | 2018119310 | 6/2018 |

OTHER PUBLICATIONS

Boesch, Gaudenz, "AI Emotion and Sentiment Analysis with Computer Vision in 2023"; (2023); Accessed from https://viso.ai/deep-learning/visual-emotion-ai-recognition/ Sep. 13, 2023.
International Search Report and Written Opinion for PCT/US2024/046912, mailed Nov. 13, 2024, 14 pages.
Wang Yunlong et al: "RePrompt: Automatic Prompt Editing to Refine AI-Generative Art Towards Precise Expressions", Proceedings of The 2023 CHI Conference on Human Factors in Computing Systems, ACMPUB27, New York, NY, USA, Apr. 19, 2023 (Apr. 19, 2023), pp. 1-29, XP059510946, DOI: 10.1145/3544548.3581402 ISBN: 978-1-4503-9421-5 p. 2; figure 1.

* cited by examiner

*Primary Examiner* — Joni Hsu
(74) *Attorney, Agent, or Firm* — RAY QUINNEY & NEBEKER; Thomas L. Lingard

(57) ABSTRACT

An image generation system may receive a set of descriptors. An image generation system may generate a prompt input using the set of descriptors. An image generation system may apply a prompt generator model to the prompt input to generate an image prompt for a generative artificial intelligence (AI) model, wherein the image prompt includes a context generated based on the set of descriptors, wherein the image prompt includes a prompt format configured to be input into the generative AI model. An image generation system may input the image prompt to the generative AI model, the generative AI model using the image prompt to generate an image based on the context.

20 Claims, 9 Drawing Sheets

GENERATING PROMPTS FOR IMAGE GENERATION USING A GENERATIVE ARTIFICIAL INTELLIGENCE MODEL

CROSS-REFERENCE TO RELATED APPLICATIONS

N/A.

BACKGROUND

Many people express themselves through images, video, audio, and other consumable content. Images, for example, allow for the expression of complex concepts, including concepts that are hard for a person to verbalize or otherwise express with words. In some situations, viewing an image may help to soothe a user through the expression of these complex concepts. Recent years have seen significant progress in the capabilities and increased use of computing devices to surface, deliver, or otherwise present images, videos, and other consumable content that reflects a wide range of expressions and concepts. Indeed, as mobile devices, Internet of Things (IoT) devices, and other consumer electronics become more complex and capable, a wider range of devices are being used to deliver more and more complex audio and visual content to end users.

In addition to the increase in the range of devices that are delivering content, recent years have also seen advances in the field of artificial intelligence and content generation. Such generative artificial intelligence (AI) models may be trained on large datasets and may generate images based on the datasets. But typical AI models may not generate images that are relevant to the user's intent. This may result in images that do not fully express the desired concept. In some situations, the AI model may generate images having low relevance based on the query used to request the images. Such queries may be imprecise and/or may not fully capture the user's intent.

BRIEF SUMMARY

In some aspects, the techniques described herein relate to a method for generating and delivering content items, such as images (e.g., digital images). The method includes receiving a set of descriptors. A descriptor collector generates a prompt input using the set of descriptors. A prompt generator applies a prompt generator model to the prompt input to generate an image prompt for a generative artificial intelligence (AI) model. The image prompt includes a context generated based on the set of descriptors. The image prompt includes a prompt format configured to be input into the generative AI model. The image prompt is inputted to the generative AI model. The generative AI model uses the image prompt to generate an image based on the context.

This summary is provided to introduce a selection of concepts that are further described below in the detailed description. This summary is not intended to identify key or essential features of the claimed subject matter, nor is it intended to be used as an aid in limiting the scope of the claimed subject matter. Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
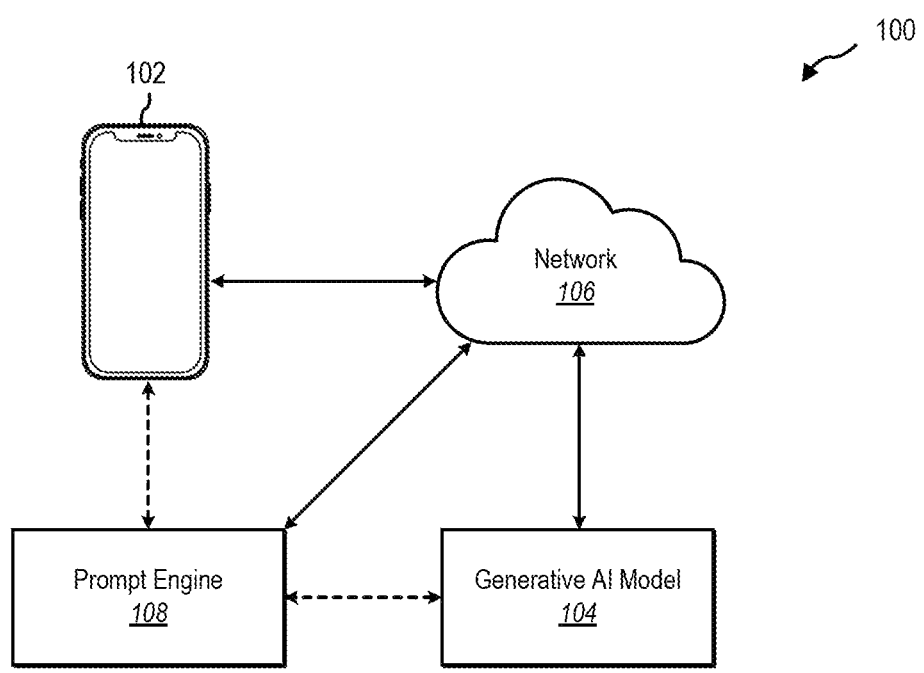
FIG. 1 is a representation of an image generation system, according to at least one embodiment of the present disclosure.

This disclosure generally relates to systems and methods for generating consumable content, such as digital images (or simply "images"), using a generative artificial intelligence (AI) model. The generative AI model may generate images using a set of descriptors, such as input words. Using the descriptors, a prompt engine may generate an image prompt for the generative AI model. The generative AI model may be applied to the image prompt to generate one or more images. The user may then use the generated images in any manner, including as a background for a computing device, as a message, as a presentation background, as decorative art, any other use, and combinations thereof. In this manner, a user may utilize the generative AI model to generate artistic representations of the descriptors. This may provide the user with a mechanism to express his or her current status, desires, or mood.

In some embodiments, as will be discussed in further detail herein, the prompt engine may utilize the descriptors to generate the image prompt. In some embodiments, the prompt engine may prepare the image prompt that is tailored to the particular generative AI model. For example, the prompt engine may generate the image prompt using context that is generated using the descriptors. The context may have a prompt format that targets the generative AI model. For example, the prompt format may be configured to adjust the resulting images to be more representative of the descriptors.

In accordance with at least one embodiment of the present disclosure, the prompt engine may create a dynamic prompt. For example, when the prompt engine generates the image prompt, the prompt engine may provide the image prompt to the user. The user may review the image prompt. If the user identifies a change, the user may adjust the image prompt. For example, the user may adjust the input descriptors used as input to the prompt engine. In some examples, the user may adjust the image prompt in the image prompt's native format. This may allow the user to adjust the image to match the user's preferences and/or to more closely resemble the user's desire, based on the input text and/or descriptors.

In accordance with at least one embodiment of the present disclosure, the dynamic prompt may help to reduce the processing budget of the image generation system. For example, the dynamic prompt may help to reduce the complexity of the input to the generative AI model. This may help to reduce the utilization of processing power and other processing resources used by the generative AI model, thereby reducing the processing budget of the image generation system.

In accordance with at least one embodiment of the present disclosure, the descriptors used to generate the image prompt may describe a desired result for the image generated by the generative AI model. For example, the descriptors may include words that describe an emotional state user, an artistic style, colors, ideas, concepts, any other descriptors, and combinations thereof. The descriptors may have at least some user input. For example, the user may provide a selection of pre-determined inputs, natural language input, any other input, and combinations thereof. Selecting the descriptors may allow the user control over the resulting image generated by the generative AI model.

In some embodiments, the images generated by the generative AI model may be utilized in any manner. For example, the images generated by the generative AI model may be used as the background of the user's computing device. This may help the user to express emotions, feelings, or ideas. In some embodiments, the images may allow the user to emotions, feelings, or ideas that are complex and difficult for the user to verbalize. In some embodiments, the images may be applied as the background of the user's computing device, such as the user's mobile phone, tablet, laptop computer, watch, desktop computer, gaming console, any other computing device, and combinations thereof. This may allow the user to express him or herself on his or her computing device. In some examples, the user may apply the images in any application, such as the background of a presentation slide, a watermark, a printed image, a background for playing cards, any other use, and combinations thereof.

In addition, while one or more embodiments described herein refer specifically to examples in which the models are used to generate image prompts and to identify, generate, or otherwise obtain images to be presented via a graphical user interface (GUI) of a computing device, the features described herein may apply to other types of consumable content. For example, in one or more implementations, rather than generating image prompts, and generating or otherwise obtaining images, the content that is determined and presented may be video content, audio content, or combination of visual and/or audio content to be presented via the GUI. Indeed, features and functionality described in connection with the image generator system may apply to a variety of types of digital content consumable via a user's computing device.

In some embodiments, the generative AI model may generate multiple images using the same image prompt. The generative AI model may generate multiple images and update the computing device's background every time the images are updated. In some embodiments, the generative AI model may generate multiple images and store the images on the computing device. The user may then browse the images and identify his or her favorite to use as the background image. In some embodiments, the image generation system may update computing device background periodically or episodically using the stored images.

As illustrated by the foregoing discussion, the present disclosure utilizes a variety of terms to describe features and advantages of the image generation system. Additional detail is now provided regarding the meaning of such terms.

For example, as used herein, an artificial intelligence (AI) model, or machine learning (ML) model may refer herein to any type of AI or ML model. Such an AI model may include a model that is trained to provide a response to an input based on a dataset. Examples of AI models may include neural nets, linear regression, deep neural networks, logistic regression models, any other type of AI model, and combinations thereof. In some embodiments, the AI model may include a foundation model, and unless explicitly stated otherwise, the terms may be used interchangeably.

As used herein, a "foundation model" refers to an AI or ML model that is trained to generate an output in response to an input based on a large dataset. A foundation model may include a neural network having a large number of parameters (e.g., billions of parameters) that the model may consider in performing a task or otherwise generating an output based on an input. In one or more embodiments described herein, a foundation model is trained to generate a response to a query. In some implementations, a foundation model refers to an image generation model. The foundation model be trained in pattern recognition and image generation. For example, the foundation model may be trained based on a set of images and associated descriptions of the images therein. The foundation model may be trained to generate an output image upon receipt of an input of an image prompt and based on the trained associations. In one or more implementations described herein, the foundation model refers specifically to an image generation model, though other types of foundation models may be used in generating responses to input queries.

As used herein, a generative AI model may be an AI model or a foundation model that is used to generate new content. The generative AI model may generate any type of content. For example, the techniques discussed herein may relate to a generative AI model that generates images. In some examples, one or more generative AI models of the present disclosure may generate multiple images configured to be displayed in sequential order, such as GIFs or movies. In some examples, one or more of the generative AI models discussed herein may generate sounds, noises, and/or music.

As used herein, "context" may be information that may be used by a foundation model or other AI model that directs the model to generate a relevant response to a prompt.

Context information may include information related to the prompt that is not directly stated in the prompt. For example, in one or more embodiments described herein, context is information generated based on similarity metrics between a query and a database of additional information (e.g., domain-specific information). The similarity metrics may be based on the format of the generative AI model, such as image similarity metrics, sound similarity metrics, and so forth. Context may be generated based on a prompt inputted into the generative AI model. In some embodiments, context may be included in the image prompt.

As used herein, a "prompt" may be an input or a query to an AI model (such as a generative AI model) used to generate a particular output. The prompt may include prompt factors that are used to generate the output. For example, the prompt factors may be used to identify particular features of the output of the generative AI model. In some examples, the prompt factors for an image generative AI model may include prompt factors directed to image features, such as emotion, color, size, shape, artistic style, any other image feature, and combinations thereof. In some embodiments, a prompt may be a specialized query that is tailored to generate a particular response. In some embodiments, a prompt may be generated from user input. For example, the prompt may be generated based on user input selected from a pre-determined list, user input inputted as natural language, user input in the form of related images, any other user input, and combinations thereof.

FIG. 1 is a representation of an image generation system 100, according to at least one embodiment of the present disclosure. The image generation system 100 includes a client device 102. The client device 102 may include any client device. For example, the client device 102 may include a computing device, such as a mobile device, such as a smartphone, a tablet, a laptop computer, a desktop computer, a smart watch, a console, any other computing device, and combinations thereof. The client device 102 may send a request (e.g., a query) to a generative AI model 104 to generate an image. In some embodiments, the client device 102 may be in communication with the generative AI model 104 over a network 106. The network 106 may include any network, such as the Internet, a local area network (LAN), a wide-area network (WAN), a Wi-Fi network, a cellular network, any other network, and combinations thereof. In some embodiments, the client device 102 and the generative AI model 104 may be in direct communication. For example, the client device 102 may be in direct communication with the generative AI model 104 over a wired connection or a wireless connection (e.g., Bluetooth, near-field communication (NFC), Wi-Fi network). In some embodiments, the generative AI model 104 may be stored locally on the client device 102. In some embodiments, the generative AI model 104 may be remote from the client device 102. For example, the generative AI model 104 may be installed on a server in communication with the client device 102 over the Internet.

The generative AI model 104 may include any foundation model or other AI or ML model trained to generate images. The generative AI model 104 may be trained on any database. For example, the generative AI model 104 may be trained using photographs, artwork, illustrations, comics, movies, cartoons, any other images, and combinations thereof. A non-limiting list of generative AI models 104 may include DALL-E, DALL-E 2, midjourney, DreamStudio, firefly, any other generative AI model, and combinations thereof. While specific generative AI models 104 are described herein, it should be understood that the techniques of the present disclosure may be applicable to any generative AI model, including generative AI models not listed and generative AI models yet to be developed or trained.

The generative AI model 104 may, upon receipt of the request or the query, generate an image based on the request. The generative AI model 104 may send the generated image back to the client device 102. The client device 102 may utilize the generated image in any manner. For example, the client device 102 may automatically set the generated image as the background image for the client device 102 and/or another computing device. In some examples, the client device 102 may otherwise utilize the generated image, such as a tile-able image for use as a background for a document (e.g., a presentation, a text document), an image used in a gaming application, an image printed on games and/or toys (e.g., backs of printed cards), any other use, and combinations thereof.

In some embodiments, the client device 102 may submit an unaltered request or query to the generative AI model 104. For example, the client device 102 may submit a request for an image that includes a natural language request. Such a natural language request may include details surrounding the image. An example of a simple, non-limiting natural language request may include "I would like an image expressing happiness using greens and blues." The natural language request may be submitted to the generative AI model 104 and the generative AI model 104 may identify image factors to include in the generated image from the natural language request. In the specific example identified above, the generative AI model 104 may identify the concrete factors of blue and green colors, as well as the more abstract concept of happiness. The generative AI model 104 may then generate an image using the abstract concept of happiness using the colors green and blue.

In some embodiments, the client device 102 may submit a request or query for an image using one or more pre-selected terms. For example, the client device 102 may include a user interface (UI) that may include drop-down menus or other selection mechanisms that may allow the user to select one or more pre-selected terms. Such terms may be descriptors of the image, and may include any descriptive element of an image, such as colors, emotions, artistic styles, abstract concepts, any other descriptor, and combinations thereof. The client device 102 may submit the list of selected words to the generative AI model 104 and the generative AI model 104 may generate an image based on the provided words.

In the non-limiting example provided above, the user may select the emotion "happiness" from a pre-determined list of emotions and the colors "blue" and "green" from a predetermined list of colors. The client device 102 may provide the generative AI model 104 with the three words happiness, blue, and green, and the generative AI model 104 may generate an image using those words. Providing only the descriptors to the generative AI model 104 may help to reduce the processing of the request or the query by the generative AI model 104.

In accordance with at least one embodiment of the present disclosure, the client device 102 may send the request or the query for an image to a prompt engine 108, and the prompt engine 108 may generate an image prompt to provide to the generative AI model 104. The prompt engine 108 may generate an image prompt using the descriptors. For example, the prompt engine 108 may generate an image prompt to input into the generative AI model 104 to improve the image generation of the generative AI model 104. For example, the prompt engine 108 may generate an image prompt that pre-processes the descriptors. In some examples, the prompt engine 108 may generate an image prompt that processes the natural language input from the client device 102 and provides the generative AI model 104 with an image prompt based on the natural language input. In some examples, the prompt engine 108 may collect and organize the descriptors that are selected from the group of pre-determined descriptors. Utilizing the prompt engine 108 may help to reduce the processing load on the generative AI model 104, thereby reducing the processing cost of utilizing the generative AI model 104 to generate the requested image.

In some embodiments, the prompt engine 108 may generate an image prompt having a specific prompt format. The prompt format may be based on the particular generative AI model 104 used to generate the image. For example, the generative AI model 104 may have a particular prompt format used to receive queries to generate images. In some embodiments, the prompt engine 108 may identify a particular prompt format that generates the desired images. The prompt format may be tailored to any number of factors. For example, the prompt format may be tailored to reducing the processing power utilized by the generative AI model 104 to generate the image. In some examples, the prompt format may be tailored to generating images that are highly relevant, or that are representative and/or embody the descriptors used to request the images. In some examples, the prompt format may target parameters and/or factors utilized during training of the generative AI model 104. In some embodiments, the prompt format may include factors that are based on preferred inputs for the generative AI model 104. The preferred inputs may be based on the training parameters, programming, and/or training database of the generative AI model 104. In some embodiments, the prompt format may include any other and/or any combination of factors.

In some embodiments, the prompt format may include context information usable by the generative AI model 104 to generate the images. For example, the prompt format may include context such as a particular training database, a particular domain, a particular sub-database, any other context information, and combinations thereof. In some embodiments, the context information may be generated based on the descriptors. For example, the context information may identify a sub-database or a filter on a database based on the descriptors, such as a filter applied to a color, an artistic style, an identified emotion, and so forth. In some embodiments, the context information may identify a domain, such as images produced by a particular source.

The generative AI model 104 may utilize the context information to improve the generation of the image. For example, the generative AI model 104 may utilize the context information to limit the information used to generate the image to the descriptors. In this manner, the context generated by the prompt engine 108 may help to increase the relevance of the generated image to the user's inputted descriptors.

In some embodiments, the prompt engine 108 may generate a dynamic image prompt. For example, the prompt engine 108 may generate an image prompt and provide it to the user for review. The user may review the image prompt and provide feedback. For example, the user may review the image prompt and adjust one or more of the descriptors in the image prompt. In some examples, the user may review the image prompt and adjust the context of the image prompt, such as by adjusting the domain, database, sub-database, or other portion of the image prompt. A dynamic image prompt may help to improve the relevance of the generated images and/or reduce the processing budget of the generative AI model 104.

In some embodiments, the image generation system 100 may include a single generative AI model 104. For example, the client device 102 and/or the prompt engine 108 may generate a query or an image prompt and send it to a single generative AI model 104 to generate the image. In some embodiments, the image generation system 100 may include multiple generative AI models 104. The query or image prompt may be sent to each of the generative AI models 104 and each of the generative AI models 104 may generate an image based on the query or image prompt. This may allow the user to review images generated by multiple generative AI models 104 and identify the ones he or she likes best.

In some embodiments, the prompt engine 108 may be in communication with the client device 102 and/or the generative AI model 104 over the network 106. In some embodiments, the prompt engine 108 may be in direct communication with the client device 102 and/or the generative AI model 104.

Figure 2:
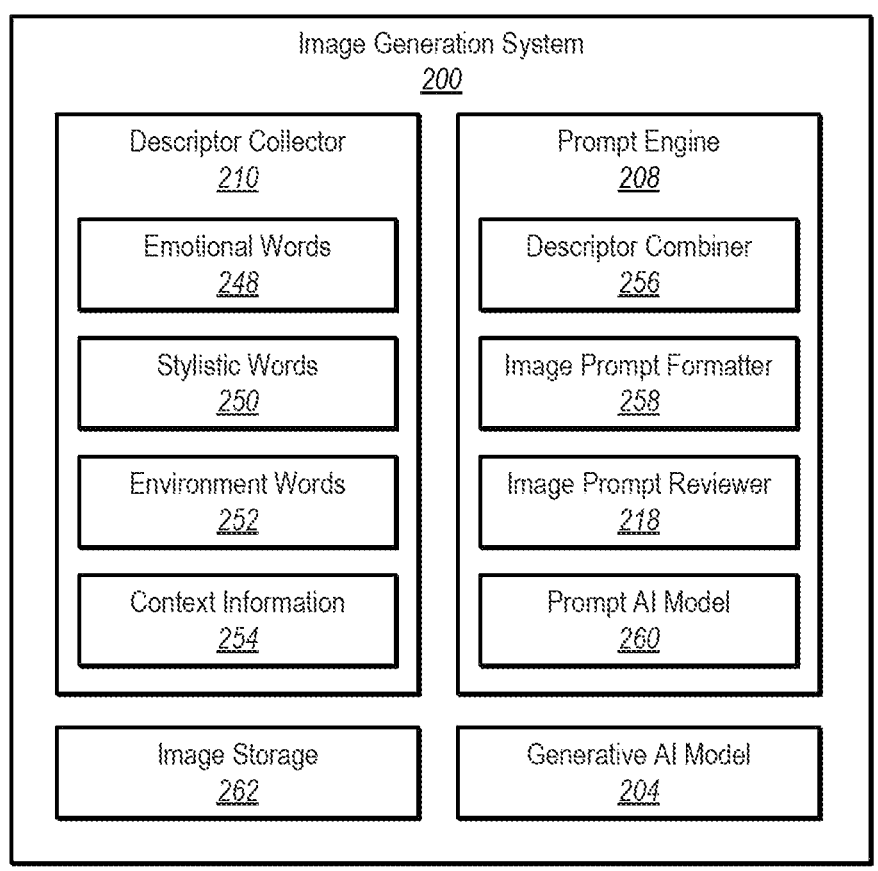
FIG. 2 is a representation of an image generation system, according to at least one embodiment of the present disclosure.

FIG. 2 is a representation of an image generation system 200, according to at least one embodiment of the present disclosure. Each of the components of the image generation system 200 can include software, hardware, or both. For example, the components can include one or more instructions stored on a computer-readable storage medium and executable by processors of one or more computing devices, such as a client device or server device. When executed by the one or more processors, the computer-executable instructions of the image generation system 200 can cause the computing device(s) to perform the methods described herein. Alternatively, the components can include hardware, such as a special-purpose processing device to perform a certain function or group of functions. Alternatively, the components of the image generation system 200 can include a combination of computer-executable instructions and hardware.

Furthermore, the components of the image generation system 200 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps.

The image generation system 200 may include a descriptor collector 210. The descriptor collector may collect one or more descriptors. As discussed herein, the descriptors may include any type of descriptor. For example, the descriptor collector 210 may collect descriptive words. The descriptive words may include any type of descriptive words. For example, the descriptive words may include descriptive words selected from a pre-determined list of descriptive words. In some examples, the descriptive words may include descriptive words entered free-form by the user.

The descriptors collected by the descriptor collector 210 may include emotional words 248. The emotional words 248 may include conceptual emotional words, including emotions such as happiness, sadness, fear, regret, hope, surprise, disgust, anger, anticipation, joy, trust, remorse, any other emotion, and combinations thereof. In some embodiments, the user may select and/or identify multiple emotional words 248. In some embodiments, the emotional words 248 may include abstract ideas, such as democracy, freedom, confidence, friendship, faith, knowledge, truth, duty, science, art, leisure, any other abstract idea, and combinations thereof.

In some embodiments, the descriptor collector 210 may collect descriptors that include one or more stylistic words 250. The stylistic words 250 may include any stylistic words. For example, the stylistic words 250 may include artistic styles, such as realistic, romantic, abstract, impressionist, painterly, pointillist, photorealistic, painting, surrealism, cubism, expressionism, minimalism, Chibi, modern cartoon, comic, manga, anime, any other artistic style, and combinations thereof. In some embodiments, the stylistic words 250 may include a particular artist and/or work of art. For example, the user may appreciate the style of a particular artist or a particular work of art, and the user may input stylistic words 250 representative of the artist and/or work of art. In some examples, the descriptor collector 210 may collect artistic works, such as images, paintings, comics, cartoons, other artistic works, and combinations thereof.

In some embodiments, the descriptor collector 210 may collect environment words 252. Environment words 252 may include words or other descriptors related to the environment of the image. For example, the environment words 252 may include words related to a particular environment for the image. Examples of environments may include natural environments, such as desert, forest, mountains, ocean, any other type of natural environment, and combinations thereof. Other examples of environments may include more abstract types of environments, such as cozy, warm, cold, friendly, hostile, any other abstract environment, and combinations thereof.

In some embodiments, the descriptor collector 210 may collect context information 254. The context information 254 may include context information such as the particular database or sub-database to be considered when generating the image. For example, the context information 254 may include all images accessible in the public domain. In some examples, the context information 254 may include images accessible through a particular website. In some examples, the context information 254 may include images sourced from a particular source. In some embodiments, the context information 254 may include database information. For example, the context information 254 may include images accessible from a private database. In some examples, the context information 254 may include images accessible from a sub-database, such as a portion of a publicly accessible database. In some embodiments, the context information 254 may include an end-use for the image. Examples of end-uses may include the size of the image (e.g., file size, pixel size, aspect ratio of the image), the resolution of the image, the file format of the image, the purpose of the image (e.g., computing device wall paper/screen saver, decorative art, entertainment, physical prints), any other end-use, and combinations thereof.

In some embodiments, the descriptor collector 210 may further collect any other descriptors, including description words not described herein. In some embodiments, the descriptor collector 210 may collect non word descriptors. For example, the descriptor collector 210 may collect sounds (including described sounds and/or sound files), images, GIFs, videos, flavors, tastes, chemical information, biological information, any other descriptor, and combinations thereof.

In some embodiments, the descriptor collector 210 may collect and/or infer one or more descriptors from media content. For example, the descriptor collector 210 may collect and/or infer descriptors from a user's social media content, including posts and/or viewed content. In some examples, the descriptor collector 210 may collect and/or infer descriptors by identifying keywords in social media posts. This may allow the descriptor collector 210 to infer emotion and/or a user's state of mind. In some examples, the descriptor collector 210 may collect and/or infer descriptors by identifying trends in the images posted and/or viewed in the social media. In some examples, the descriptor collector 210 may collect descriptors from other media content, such as a user's emails, text messages, voice calls, conversations, internet history, television content, streaming content, movie content, written documents, any other media content, and combinations thereof.

The descriptor collector 210 may include a prompt engine 208. The prompt engine 208 may generate an image prompt to submit to a generative AI model 204. To generate the image prompt, the prompt engine 208 may include a descriptor combiner 256. The descriptor combiner 256 may combine, collate, sort, filter, or otherwise process the descriptors collected from the descriptor collector 210. The descriptor combiner 256 may generate a prompt input to send to the prompt generator.

In some embodiments, the prompt engine 208 may, using the prompt input (e.g., the processed descriptors), generate the image prompt. As discussed herein, the prompt engine 208 may generate the image prompt in a prompt format using an image prompt formator 258. For example, the prompt engine 208 may generate the image prompt in the prompt format that is tailored to a particular generative AI model 204. By generating the image prompt in the prompt format, the prompt engine 208 may increase the relevance of the image generated by the generative AI model 204.

As discussed herein, the generative AI model 204 may include multiple generative AI models 204, each of which may be trained with a different training database and/or trained with a different neural network or training paradigm. In some embodiments, the same prompt may be sent to each of the generative AI models 204. In some embodiments, different image prompts may be generated for different generative AI models 204. For example, the prompt engine 208 may generate different image prompts having a different prompt format for the same set of descriptors. Generating different image prompts for different generative AI models 204 may help to generate relevant images with each of the generative AI models.

As discussed herein, the prompt engine 208 may include an image prompt reviewer 218. The image prompt reviewer 218 may present the image prompt to the user. The user may review the image prompt and/or revise the image prompt. Such a dynamic image prompt may help the user to tailor the image to his or her desires. In some embodiments, the dynamic image prompt may help to reduce the processing of the generative AI model 204.

The prompt engine 208 may generate the prompt in any manner. For example, the prompt engine 208 may use the descriptor combiner 256 to organize and/or arrange the descriptors in the prompt format. In some embodiments, the prompt engine 208 may utilize one or more AI or ML models to generate the image prompt. For example, the prompt engine 208 may include a prompt AI model 260. The prompt AI model 260 may receive the descriptors, including any natural language descriptors, free-form descriptors, and/or descriptors selected from a pre-determined list of selectors. The prompt AI model 260 may be trained to generate an image prompt for a particular generative AI model 204 using the selectors. The prompt AI model 260 may be any type of AI, ML, or foundation model. For example, the prompt AI model 260 may include a large language model (LLM) trained on massively large datasets of text. In some examples, the prompt AI model 260 may include a model specifically trained to image prompts to generate relevant output images when the generative AI model 204 is applied to the image prompt.

As discussed herein, the generative AI model 204 may be applied to the image prompt to generate one or more images based on the image prompt. In some embodiments, the generative AI model 204 may generate images periodically and/or episodically. For example, the generative AI model 204 may generate an image every time an image prompt is submitted to the generative AI model 204 and the generative AI model 204 is applied to the image prompt. In some examples, the generative AI model 204 may generate an image using the same prompt (but with a different randomization) based on a periodic schedule, such as hourly, daily, weekly, monthly, yearly, any other period, and combinations thereof. In some examples, the generative AI model 204 may generate an image based on one or more episodic events, such as upon request by a user, upon retrieval of an image from an image storage 262, upon access to a computing device (or a certain number of accesses to a computing device), any other episodic event, and combinations thereof.

In some embodiments, the images generated by the generative AI model 204 may be transmitted to the user device. In some embodiments, the images generated by the generative AI model 204 may be stored in the image storage 262. For example, the generative AI model 204 may generate multiple images and store the images in the image storage 262.

The user may access the stored images as desired. In some embodiments, the user may access the images in the image storage 262 after the images are generated. In some embodiments, the images may be sent to the user device from the image storage 262 periodically and/or episodically.

Figure 3:
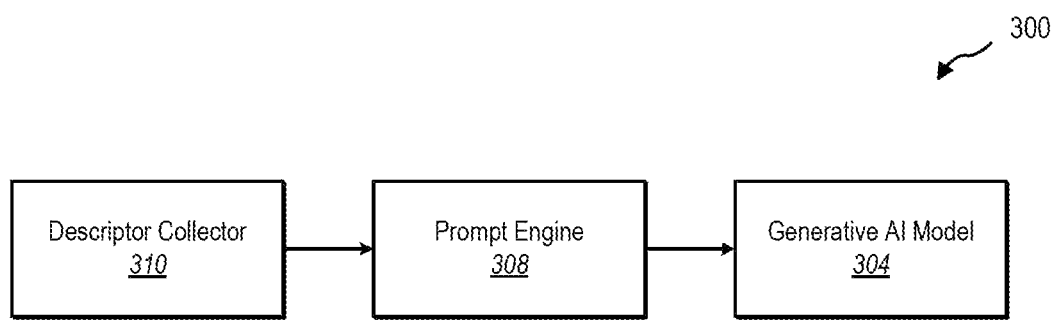
FIG. 3 is a schematic representation of an image generation system, according to at least one embodiment of the present disclosure.

FIG. 3 is a schematic representation of an image generation system 300, according to at least one embodiment of the present disclosure. The image generation system 300 may include a descriptor collector 310. The descriptor collector 310 may collect descriptors from the user. In some embodiments, the descriptor collector 310 may be implemented at the user device. For example, the descriptor collector 310 may be implemented as an application having a UI into which the user may input and/or select descriptors. For example, the descriptor collector 310 may include a series of drop-down menus, text forms, radial buttons, checkboxes, any other input mechanism, and combinations thereof. In some embodiments, the descriptors may include a series of descriptive words. In some embodiments, the descriptors may include numbers. In some embodiments, the descriptors may include representative images.

The descriptor collector 310 may collect any type of descriptor. For example, as discussed herein, the descriptors may include colors, emotions, abstract concepts, artistic styles, image size, image source, any other descriptor, and combinations thereof. The descriptor collector 310 may fill in the pre-determined descriptors in any manner. For example, the descriptor collector 310 may fill in the pre-determined descriptors using user-generated lists. In some examples, the descriptor collector 310 may fill in the pre-determined descriptors using lists generated from literary sources (such as the top emotions experienced by people, the colors most commonly associated with particular concepts or emotions, the most common artistic styles).

When the user selects the descriptors from the descriptor collector 310, the descriptors may be summarized in a prompt input that is provided to a prompt engine 308. The prompt engine 308 may generate an image prompt based on the descriptors and/or the prompt input received from the descriptor collector 310. For example, the as discussed herein, the prompt engine 308 may generate a prompt input that includes context based on the descriptors. In some embodiments, the image prompt may be in a prompt format that is based on a generative AI model 304.

After generating the image prompt, the prompt engine 308 may send the image prompt to the generative AI model 304. The generative AI model 304 may then utilize the image prompt to generate an image based on the descriptors.

Figure 4:
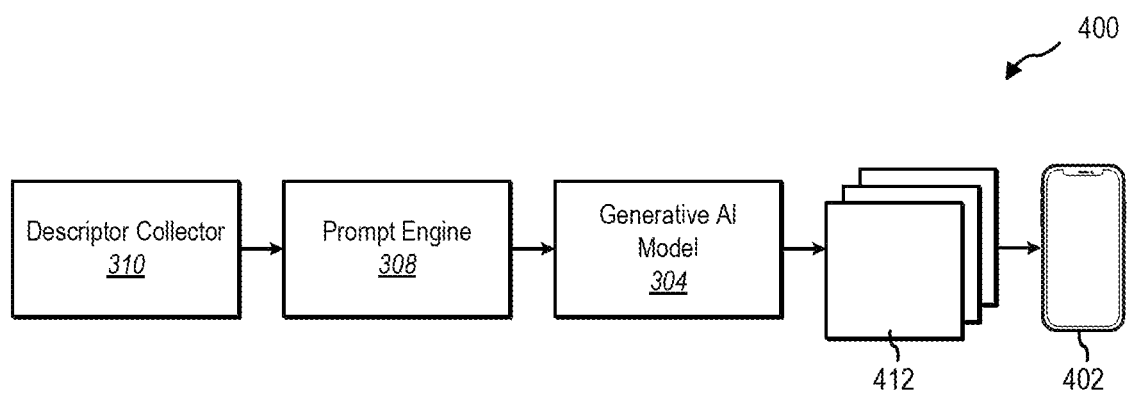
FIG. 4 is a schematic representation of an image generation system, according to at least one embodiment of the present disclosure.

FIG. 4 is a schematic representation of an image generation system 400, according to at least one embodiment of the present disclosure. The image generation system 400 may include a descriptor collector 410. The descriptor collector 410 may collect descriptors from the user. The descriptor collector 410 may process the descriptors to generate a prompt input to provide to a prompt engine 408. The prompt engine 408 may generate an image prompt to provide to a generative AI model 404.

The generative AI model 404 may generate one or more images 412. The images 412 may be provided to a client device 402. As discussed herein, the images 412 may be utilized in any manner. For example, the images 412 may be utilized as the background for the user's device, as a tile-able image for a presentation or text document, for use in entertainment, for use in printed material, for any other use, and combinations thereof.

In accordance with at least one embodiment of the present disclosure, the generative AI model 404 may generate a single image 412 for a single query and/or request. For example, the prompt engine 408 may receive the descriptors from the descriptor collector 410 and generate the image query and submit the image query to the generative AI model 404 one time. The generative AI model 404 may generate one image based on the single image query.

In some embodiments, the generative AI model 404 may generate multiple images 412 based on the same query. For example, the prompt engine 408 may generate the image prompt based on the descriptors and the prompt engine 408 may submit the prompt to the generative AI model 404 multiple times to generate multiple images 412. The generative AI model 404 may include a randomization process. The randomization process may result in the generative AI model 404 generating a different image 412 with every submission of the image prompt. This may allow the user to receive multiple images 412 that are similar based on the same descriptors. This may provide the user with variety, thereby improving the user experience.

The randomization may take any form. For example, the randomization may be based on a random number generator. The random number generator may include a formula or other generator that may generate an output representative of a number. The randomization may occur at the generative AI model 404. In some embodiments, the randomization may occur at the prompt engine 408 and/or the descriptor collector 410. In some embodiments, each of the images 412 may be unique, with the random number deleted or not stored after generating the image 412. In some embodiments, the prompt engine 408 may receive the random number and the random number may be associated with the resulting image. This may allow the user to re-generate the image based. For example, one of the parameters of the image prompt may include the random number, which the user may input to re-generate the desired image 412.

Figure 5:
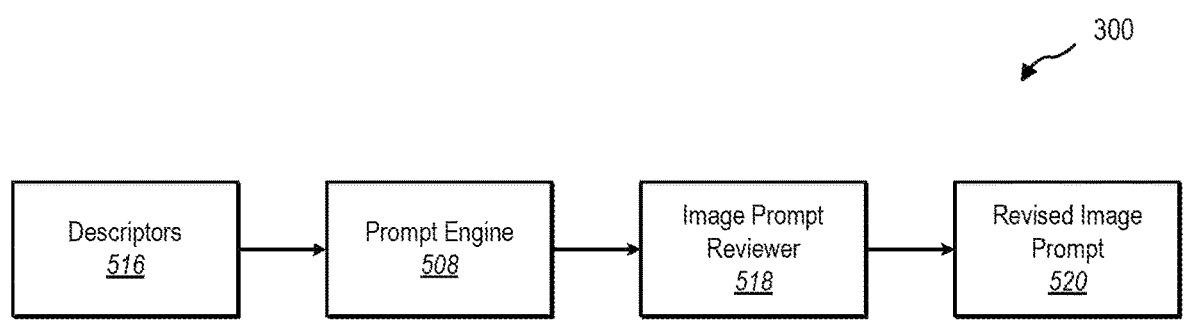
FIG. 5 is a schematic representation of a dynamic image prompt system, according to at least one embodiment of the present disclosure.

FIG. 5 is a schematic representation of a dynamic image prompt system 514, according to at least one embodiment of the present disclosure. A prompt engine 508 may receive descriptors 516. The descriptors 516 may be generated and/or received from a descriptor collector and/or a user device. The prompt engine 508 may generate an image prompt using the descriptors 516.

In accordance with at least one embodiment of the present disclosure, the prompt engine 508 may provide the user with an opportunity to review the image prompt. For example, the prompt engine 508 may present the user with the image prompt using an image prompt reviewer 518. The image prompt reviewer 518 may include a UI in which the image prompt may be provided to the user. The UI may include a text box, and the image prompt may be inserted into the text box.

In some embodiments, the image prompt inserted into the text box may include a list of the descriptors. In some embodiments, the image prompt inserted into the text box may include the image prompt in the prompt format that is directly transmitted to the generative AI model. For example, the image prompt may be scripted in a scripting language, such as Javascript, PHP, Python, Ruby, any other scripting language, and combinations thereof. In some examples, the image prompt may be generated in the same language or format that the generative AI model is generated.

Upon review of the image prompt, the user may revise the image prompt as a revised image prompt 520. For example, the user may desire to make a change to the image prompt, but may not desire to change the descriptors. The user may review the image prompt at the image prompt reviewer 518, identify the portion of the image prompt he or she desires to change, and make the associated change. This may allow the user to fine-tune the revised image prompt 520. In this manner, the user may fine-tune the image according to his or her desires by fine-tuning the revised image prompt 520.

In accordance with at least one embodiment of the present disclosure, generating the revised image prompt 520 may further help to reduce the processing load on the generative AI model. For example, generating the revised image prompt 520 may result in fewer requests to generate an image using the generative AI model. In some examples, generating the revised image prompt 520 may result in clearer instructions to the generative AI model, reducing the processing of the generative AI model. In particular, reducing the processing of the generative AI model associated with parsing the image prompt.

Figure 6:
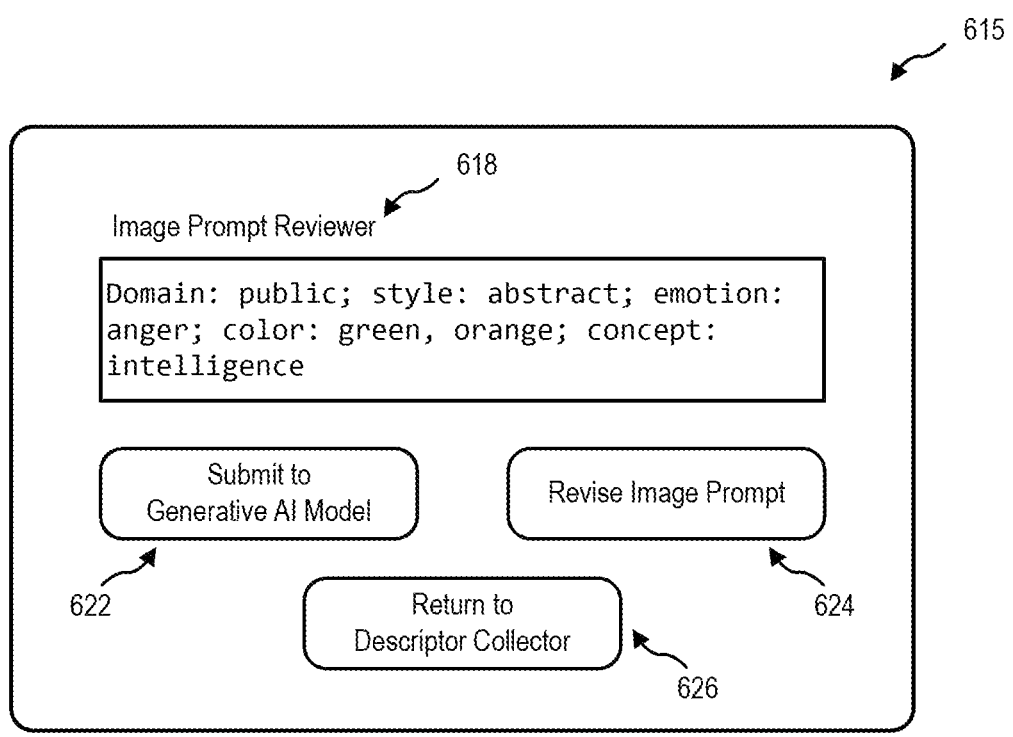
FIG. 6 is a representation of a graphical user interface (GUI), according to at least one embodiment of the present disclosure.

FIG. 6 is a representation of a graphical user interface (GUI) 615, according to at least one embodiment of the present disclosure. The GUI 615 illustrated is a schematic representation of the GUI with which a user may interact, and it should be understood that other GUIs incorporating the same or similar techniques may be implemented. The GUI 615 may include an image prompt reviewer 618. The image prompt reviewer 618 may include a dialog box or a text box in which the image prompt is displayed. The user may review the image prompt in the text box.

In accordance with at least one embodiment of the present disclosure, the user may adjust and/or revise the image prompt in the image prompt reviewer 618. For example, the text box in which the image prompt is displayed may be an interactive text box. The user may add and/or remove text from the image prompt in the text box of the image prompt reviewer 618. This may allow the user to revise the prompt to fine-tune the resulting image based on the prompt.

As a specific, non-limiting example, the image prompt reviewer 618 illustrated in FIG. 6 includes the image prompt: Domain: public; style: abstract; emotion: anger; color: green, orange; concept: intelligence. The image prompt is in an image format configured to generate a representative image from the generative AI model. The user may adjust the image prompt to change one or more of the elements of the image prompt. For example, the user may identify that the colors in the image prompt are green and orange, and desire to change the colors to "red, orange" in the text box of the image prompt reviewer 618. This dynamic prompt may allow the user to fine-tune the resulting image.

The image prompt may include one or more factors. For example, the image prompt may include factors that are generic to images. In some examples, the image prompt may include factors that are based on preferred inputs to the generative AI model. For example, the generative AI model may be trained based on one or more factors, including the parameters of the generative AI model, the programming of the AI model, factors of the input database, any other factors, and combinations thereof.

In some embodiments, the user may change any factor of the image prompt. For example, the user may change the domain, the style, the emotion, the color, the concept, any other element of the image prompt, and combinations thereof. In some embodiments, the user may remove one or more of the factors from the image prompt. In some embodiments, the user may add a factor to the image prompt. For example, the user may identify a factor that is not present in the image prompt that the user desires to add to the images generated by the generative AI model. The user may add the factor directly to the image prompt in the textbox of the image prompt reviewer 618. In some embodiments, the user may add a factor that may not be captured by the descriptor collector. In some embodiments, the user may add detail to the image prompt that may not be captured by the descriptor collector. In this manner, the user may revise the image prompt to fine-tune the generated image based on the factors in the image prompt.

The GUI 615 may include various interactive elements. For example, as discussed herein, the image prompt reviewer 618 may include an interactive text box in which the user may add or delete text. In some examples, the GUI 615 may include a submit icon 622. The submit icon 622 may be a selectable icon that, when selected by the user, may cause the image prompt to be inputted to the generative AI model.

The GUI 615 may further include a revise icon 624. The revise icon 624 may be a selectable icon that, when selected by the user, may allow the user to make changes to the image prompt. For example, when the GUI 615 is first presented to the user, the image prompt in the image prompt reviewer 618 may not be editable. When the user selects the revise icon 624, the text prompt in the image prompt reviewer 618 may become editable, and the user may add and/or remove text from the image prompt in the image prompt reviewer 618. In some examples, the image prompt in the image prompt reviewer 618 may be editable as soon as the GUI 615 is presented to the user. The user may revise the image prompt in the text box of the image prompt reviewer 618, and the image prompt may be saved when the user selects the revise icon 624. In some embodiments, selecting the revise icon 624 may cause one or more presets in the descriptor selector to be adjusted based on the associated changes.

In some embodiments, the GUI 615 may include a return icon 626. The return icon 626 may cause the GUI 615 to be closed and return the user to the descriptor collector. The user may decide to select the return icon 626, for example, if the user reviews the image prompt in the image prompt reviewer 618 and decides to change the image prompt by changing the descriptors. In some embodiments, the user may revise the image prompt, save the revised image prompt, and select the return icon 626 to determine how the saved revised image prompt impacts the selections of the descriptor collector.

Figure 7:
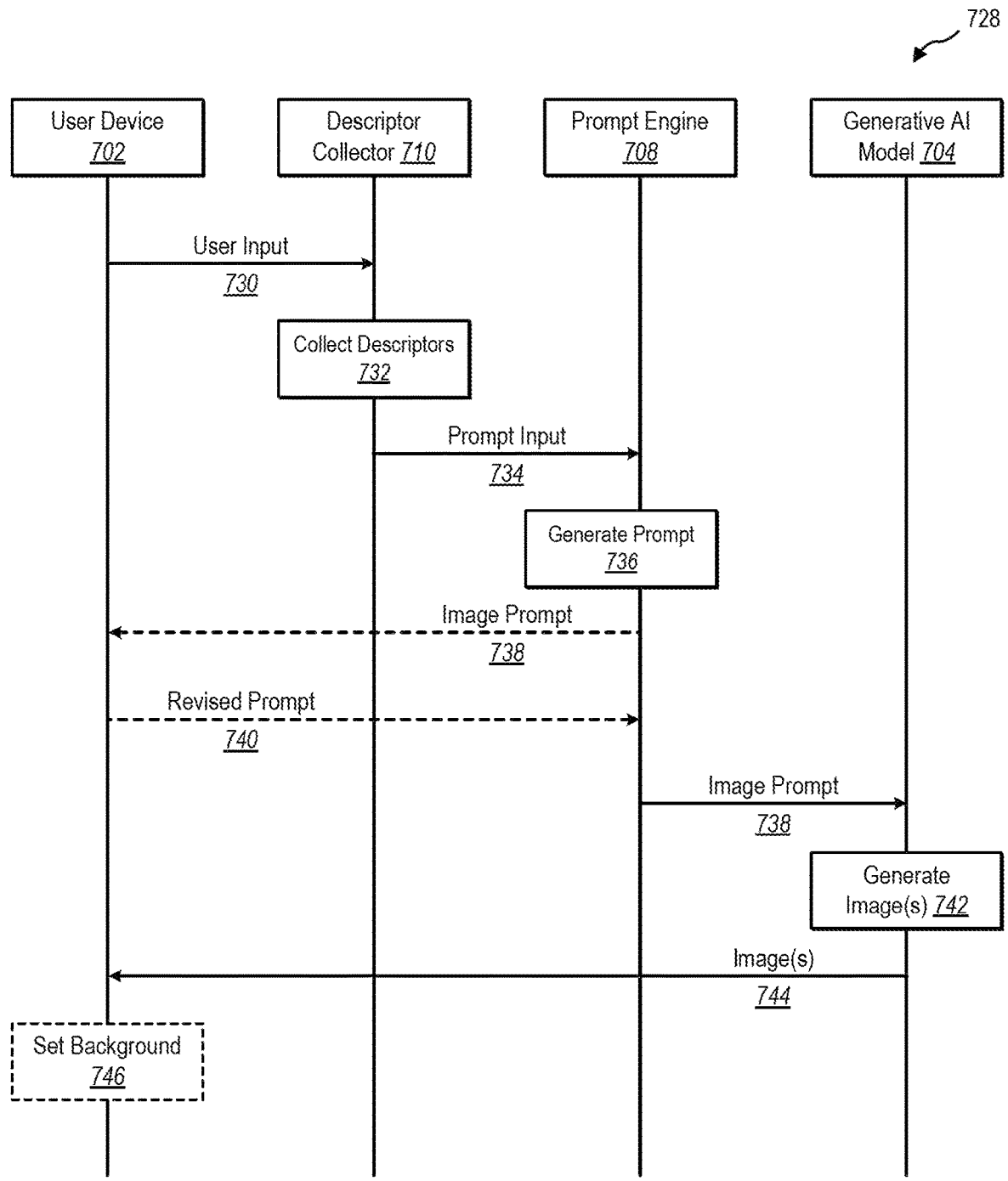
FIG. 7 is a representation of a string chart illustrating the interaction between the various elements of an image generation system, according to at least one embodiment of the present disclosure.

FIG. 7 is a representation of a string chart 728 illustrating the interaction between the various elements of an image generation system, according to at least one embodiment of the present disclosure. When a user desires to generate an image, the user, at a user device 702, may provide user input 730. The user input 730 may include any type of user input, including descriptors of the desired image. For example, the user input 730 may include descriptors selected from one or more predetermined lists, natural language, any other descriptor, and combinations thereof.

The user input 730 may be received by a descriptor collector 710. The descriptor collector 710 may collect the descriptors at 732. In some embodiments, the descriptor collector 710 may organize the descriptors. For example, the descriptor collector 710 may at least partially process, sort, filter, or otherwise organize the user input 730. This may help to reduce bandwidth of transmission to a prompt engine 708 and/or processing load of the prompt engine 708.

The descriptor collector 710 may generate a prompt input 734 comprising the descriptors and/or a processed set f the descriptors to the prompt engine 708. As discussed herein the prompt engine 708 may generate 736 an image prompt using the prompt input 734. For example, the prompt engine 708 may utilize one or more artificial intelligence models to generate the image prompt 738 using the prompt input 734.

The prompt engine 708 may optionally send the image prompt 738 to the user device 702 for review. As discussed herein, the user may optionally revise the image prompt, resulting in a revised image prompt 740. The user device 702 may transmit the revised image prompt 740 to the prompt engine 708.

The prompt engine 708 may send the finalized image prompt 738 (either the original image prompt 738 or the revised image prompt 740) to a generative AI model 704. Using the image prompt 738, the generative AI model 704 may generate 742 one or more images 744.

The generative AI model 704 may send the images 744 to the user device 702. As discussed herein, the user device 702 may utilize the images 744 in any manner. For example, the user may optionally set the background 746 with the images 744. In some examples, the user may optionally set a screensaver using the images 744. In some examples, the user may optionally utilize the images 744 in any manner, as discussed herein.

Figure 8:
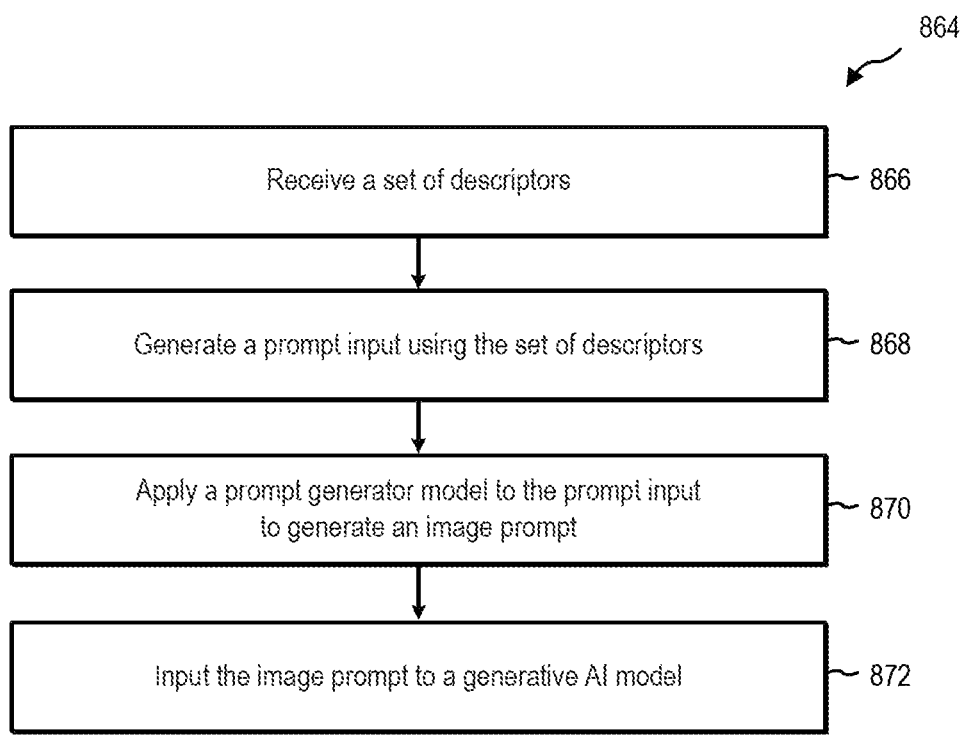
FIG. 8 is a representation of a method for generating images, according to at least one embodiment of the present disclosure.

FIG. 8, the corresponding text, and the examples provide a number of different methods, systems, devices, and computer-readable media of the image generation system. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a method 864 or a series of acts for image generation, in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a computer-readable medium can comprise instructions that, when executed by one or more processors, cause a computing device to perform the acts of FIG. 8. In some embodiments, a system can perform the acts of FIG. 8.

A descriptor collector may receive a set of descriptors at 866. As discussed herein, the descriptors may include any type of descriptors. The descriptor collector may generate a prompt input using the set of descriptors at 868. For example, the descriptor collector may process the descriptors, including analyzing, sorting, filtering, collating, or otherwise process the descriptors to generate the prompt input. In some embodiments, the descriptor collector may collect end-use descriptors for the image prompt.

The image generation system may apply a prompt generator model to the prompt input to generate an image prompt at 870. For example, the prompt generator model may analyze the descriptors and generate an image prompt to which a generative AI model may be applied. The prompt generator model may generate the image prompt having a context that is generated based on the set of descriptors. The prompt generator model may further generate the image prompt to have a prompt format that is configured to be input into the generative AI model. In some embodiments, as discussed herein, the prompt format may include a plurality of factors, the factors may be based on preferred inputs for the generative AI model.

The image generation system may input the image prompt to the generative AI model at 872. Inputting the image prompt to the generative AI model may cause the generative AI model to generate an image based on the context.

Figure 9:
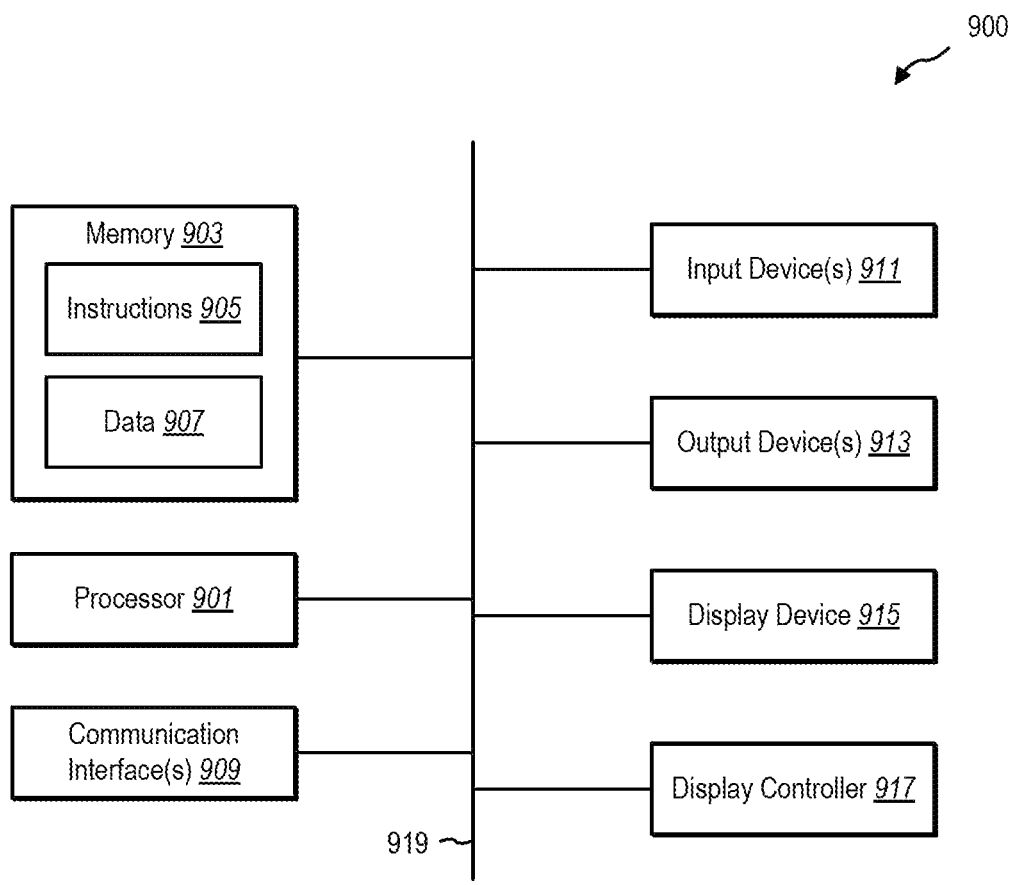
FIG. 9 is a representation of a computing system, according to at least one embodiment of the present disclosure.

FIG. 9 illustrates certain components that may be included within a computer system 900. One or more computer systems 900 may be used to implement the various devices, components, and systems described herein.

The computer system 900 includes a processor 901. The processor 901 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a set of descriptors, the set of descriptors including:
      an emotion concept word; and
      a stylistic input;
   generating an image generation prompt based on the set of descriptors using a prompt generator artificial intelligence (AI) model that is trained based on training sets of descriptors to generate output image generation prompts for providing to an image generative AI model, wherein the image generation prompt includes a prompt format configured to be input into the image generative AI model;

providing the image generation prompt to the image generative AI model; and receiving a generated image expressing the emotion concept word and the stylistic input generated by the image generative AI model based on the image generation prompt.

2. The method of claim 1, wherein the stylistic input includes one or more of a color, a size, a shape, an image feature, or an artistic style.

3. The method of claim 1, further comprising:
providing the image generation prompt to a user; and
revising the image generation prompt based on feedback from the user.

4. The method of claim 1, wherein at least one of the set of descriptors include an end-use for the generated image.

5. The method of claim 1, wherein the prompt generator AI model is further trained to generate the image generation prompt to include a context that indicates a set of one or more images related to the set of descriptors for guiding the image generative AI model, and wherein the generated image is generated by the image generative AI model based on the context.

6. The method of claim 1, further comprising providing the image generation prompt to a plurality of different image generation AI models for generating a plurality of different generated images that each differently express the emotion concept word and the stylistic input, and presenting the plurality of different generated images for a user to select.

7. The method of claim 1, further comprising applying the generated image as a background image of a user device.

8. The method of claim 7, further comprising, periodically and automatically:
generating an updated image generation prompt with the prompt generator AI model based on the set of descriptors;
providing the updated image generation prompt to the image generative AI model for generating an updated generated image that expresses the emotion concept word and the stylistic input; and
updating the background image of the user device with the updated generated image.

9. The method of claim 7, wherein the prompt generator AI model is stored locally on the user device.

10. A system, comprising:
a processor and memory, the memory including instructions that cause a processor to:
receive a set of descriptors, the set of descriptors including:
an emotion concept word; and
a stylistic input;
generate an image generation prompt based on the set of descriptors using a prompt generator artificial intelligence (AI) model that is trained based on training sets of descriptors to generate output image generation prompts for providing to an image generative AI model, wherein the image generation prompt includes a prompt format configured to be input into the image generative AI model;
provide the image generation prompt to the image generative AI model; and
receive a generated image expressing the emotion concept word and the stylistic input generated by the image generative AI model based on the image generation prompt.

11. The system of claim 10, wherein the stylistic input includes one or more of a color, a size, a shape, an image features, or an artistic style.

12. The system of claim 10, wherein the instructions further cause the processor to:
provide the image generation prompt to a user; and
revise the image generation prompt based on feedback from the user.

13. The system of claim 10, wherein at least one of the set of descriptors include an end-use for the generated image.

14. The system of claim 10, wherein the prompt generator AI model is further trained to generate the image generation prompt to include a context that indicates a set of one or more images related to the set of descriptors for guiding the image generative AI model, and wherein the generated image is generated by the image generative AI model based on the context.

15. The system of claim 10, further comprising providing the image generation prompt to a plurality of different image generative AI models for generating a plurality of different generated images that each differently express the emotion concept word and the stylistic input, and presenting the plurality of different generated images for a user to select.

16. The system of claim 10, wherein the instructions further cause the processor to apply the generated image as a background image of a user device.

17. The system of claim 16, further comprising, periodically and automatically:
generating an updated image generation prompt with the prompt generator AI model based on the set of descriptors;
providing the updated image generation prompt to the image generative AI model for generating an updated generated image that expresses the emotion concept word and the stylistic input; and
updating the background image of the user device with the updated generated image.

18. The system of claim 16, wherein the prompt generator AI model is stored locally on the user device.

19. A method, comprising:
receiving a set of descriptors that describe factors of an image via at least an emotion concept word and a stylistic input;
generating a dynamic image generation prompt based on the set of descriptors using a prompt generator artificial intelligence (AI) model that is trained based on training sets of descriptors to generate output dynamic image generation prompts for providing to an image generative AI model, wherein the dynamic image generation prompt includes a prompt format configured to be input into the image generative AI model;
revising the dynamic image generation prompt based on user input; and
receiving a generated image expressing the emotion concept word and the stylistic input generated by the image generative AI model based on the dynamic image generation prompt.

20. The method of claim 19, wherein revising the dynamic image generation prompt includes receiving revisions to one or more factors included in text of the dynamic image generation prompt.

* * * * *